United States Patent
Noda et al.

(10) Patent No.: US 7,224,862 B2
(45) Date of Patent: May 29, 2007

(54) TWO-DIMENSIONAL PHOTONIC CRYSTAL OPTICAL MULTIPLEXER/DEMULTIPLEXER USING BOUNDARY REFLECTION

(75) Inventors: Susumu Noda, Uji (JP); Takashi Asano, Kyoto (JP)

(73) Assignee: Japan Science and Technology Agency, Saitama (JP)

( * ) Notice: Subject to any disclaimer, the term of this patent is extended or adjusted under 35 U.S.C. 154(b) by 15 days.

(21) Appl. No.: 10/537,513

(22) PCT Filed: Dec. 5, 2003

(86) PCT No.: PCT/JP03/15636

§ 371 (c)(1),
(2), (4) Date: Jun. 3, 2005

(87) PCT Pub. No.: WO2004/053549

PCT Pub. Date: Jun. 24, 2004

(65) Prior Publication Data

US 2006/0051014 A1    Mar. 9, 2006

(30) Foreign Application Priority Data

Dec. 6, 2002  (JP) ............................. 2002-355632
Mar. 4, 2003  (JP) ............................. 2003-057245

(51) Int. Cl.
*G02B 6/28* (2006.01)
*G02B 6/10* (2006.01)

(52) U.S. Cl. ........................................ 385/24; 385/129
(58) Field of Classification Search ................. 385/14, 385/24, 129–132
See application file for complete search history.

(56) References Cited

U.S. PATENT DOCUMENTS 6,101,300 A  *  8/2000  Fan et al. ..................... 385/27

(Continued)

FOREIGN PATENT DOCUMENTS

EP    0 489 442 A1    6/1992

(Continued)

OTHER PUBLICATIONS

Taka Asano et al.; "2-Jigen Photonic Kessho ni yoru Hacho Gobunha Device-ten Kekkankan no Kansho-"; 2002 Nen Shunki Dai 49 Kai Oyo Butsurigaku Kankei Rengo Koenkai Koen Yokoshu; Mar. 27, 2002; separate vol. 3, p. 1039.

(Continued)

*Primary Examiner*—Sung Pak
*Assistant Examiner*—Daniel Petkovsek
(74) *Attorney, Agent, or Firm*—Oliff & Berridge, PLC

(57) ABSTRACT

In an in-plane heterostructure photonic crystal in which vacancies 32 are periodically arranged in each of forbidden band zones 301, 302, with different cycle distances, a waveguide 33 is formed passing through all the forbidden band zones and point-like defects 341, 342, . . . are formed in each of the forbidden band zones. Since, of all light propagating through the waveguide from the light introduction/take-out section 36 and having the frequency 52 demultiplexed from the predetermined point-like defect, the wavelength of light passing through the predetermined point-like defect is not included in transmission bands 51 of the waveguide in the adjacent forbidden band zone, so that the light is reflected on the boundaries 351 and 352 between forbidden band zones and introduced into the point-like defect. Thereby, the demultiplexing efficiency of light is improved. The same applies to the multiplexing efficiency.

14 Claims, 10 Drawing Sheets

U.S. PATENT DOCUMENTS

| | | | |
|---|---|---|---|
| 6,687,447 B2* | 2/2004 | Flory et al. | 385/129 |
| 6,917,744 B2* | 7/2005 | Koyama | 385/131 |
| 6,947,649 B2* | 9/2005 | Li et al. | 385/122 |
| 2002/0009277 A1* | 1/2002 | Noda et al. | 385/130 |

FOREIGN PATENT DOCUMENTS

| | | |
|---|---|---|
| EP | 1 136 853 A1 | 9/2001 |
| JP | 2001-272555 A | 10/2001 |
| JP | 2003-279764 A | 10/2003 |
| WO | WO98/57207 | 12/1998 |
| WO | WO 00/59140 | 10/2000 |
| WO | WO 01/77726 A1 | 10/2001 |
| WO | WO03/081304 | 10/2003 |
| WO | WO03/081305 | 10/2003 |

OTHER PUBLICATIONS

Bong-Shik Song et al.; Photonic Device Based on In-Plane Hetero Photonic Crystals, Science; Jun. 6, 2003, vol. 300, No. 5625, pp. 1537.

So Hoshoku et al.; "Men'nai Hetero Kozo no Kyokaimen o Mochita Hacho Gobunha Koritsu no Kojo"; 2003 Nen Shunki Dai 50 Kai Oyo Butsurigaku Kankei Rengo Koenai Koen Yokoshu; Mar. 27, 2003, separate vol. 3, pp. 1137.

So Hoshoku et al.; "Men'nai Hetero Photonic Kessho ni Yoru Hacho Gobunha Device"; 2002 Nen Shuki Dai 63 Kai Oyo Butsurigakkai Gakujutsu Koenkai Koen Yokoshu; Sep. 24, 2002, separate vol. 3, pp. 916.

Taku Asano et al.; "2-Jigen Photonics Kessho ni yoru Hacho Gobunha Device-Men' nai Hetero Kozo no Teian-"; 2002 Nen Shunki Dai 49 Kai Oyo Butsuri gaka Kankei Rengo Koenkai Koen Yokoshu; Mar. 27, 2002, separate vol. 3, pp. 1039.

Chutinan et al., "Surface-emitting channel drop filters using single defects in two-dimensional photonic crystal slabs," *Applied Physics Letters*, vol. 79, No. 17, pp. 2690-2692, Oct. 2001.

Mochizuki et al., "Optical add/drop filter using quality factor by introducing a donor-type defect," *Extended Abstracts of the Meeting of Jpn. Soc. Appl. Phys. and Related Societies, Abstract 29p-L-8*, p. 1039, Mar. 2002.

\* cited by examiner

Fig. 1
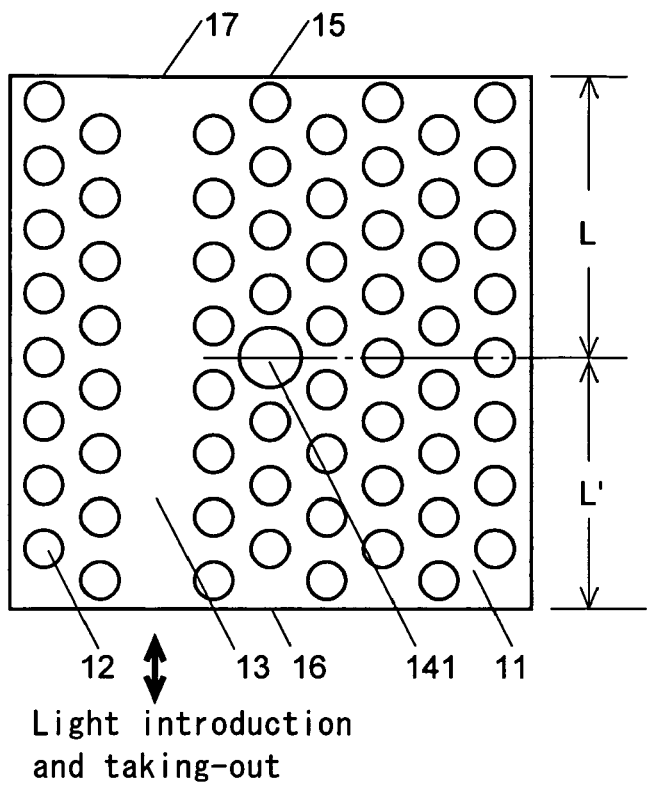
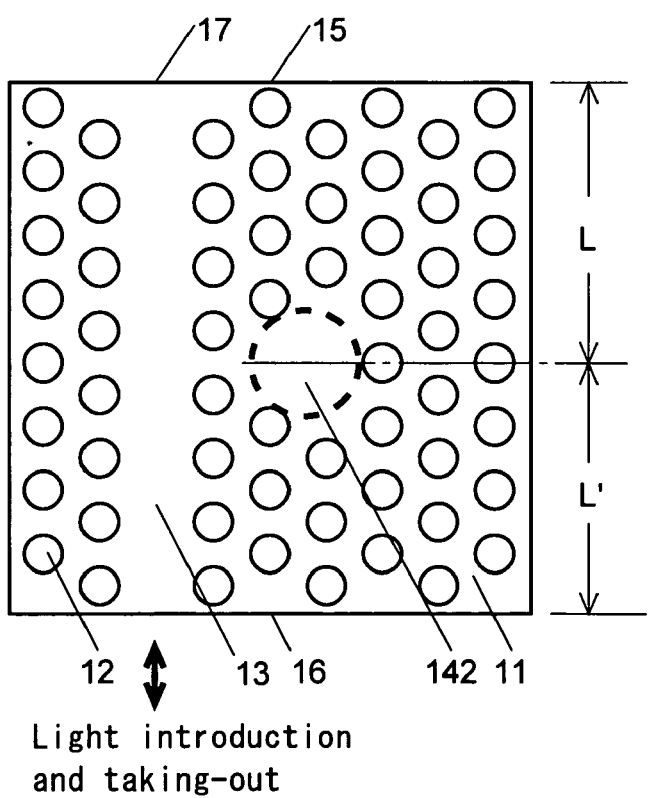

(a)

Light introduction
and taking-out

Fig. 10
(a) $2L/\lambda_0 = 389.5$, $2L'/\lambda_0 = 389.5$
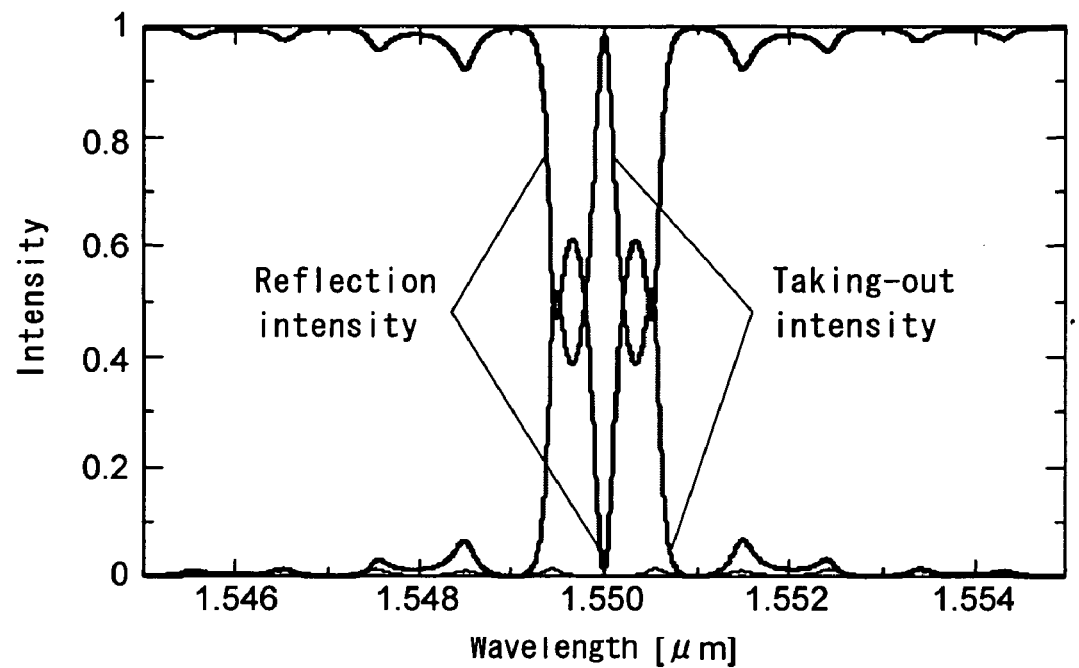
(b) $2L/\lambda_0 = 389.5$, $2L'/\lambda_0 = 389.0$
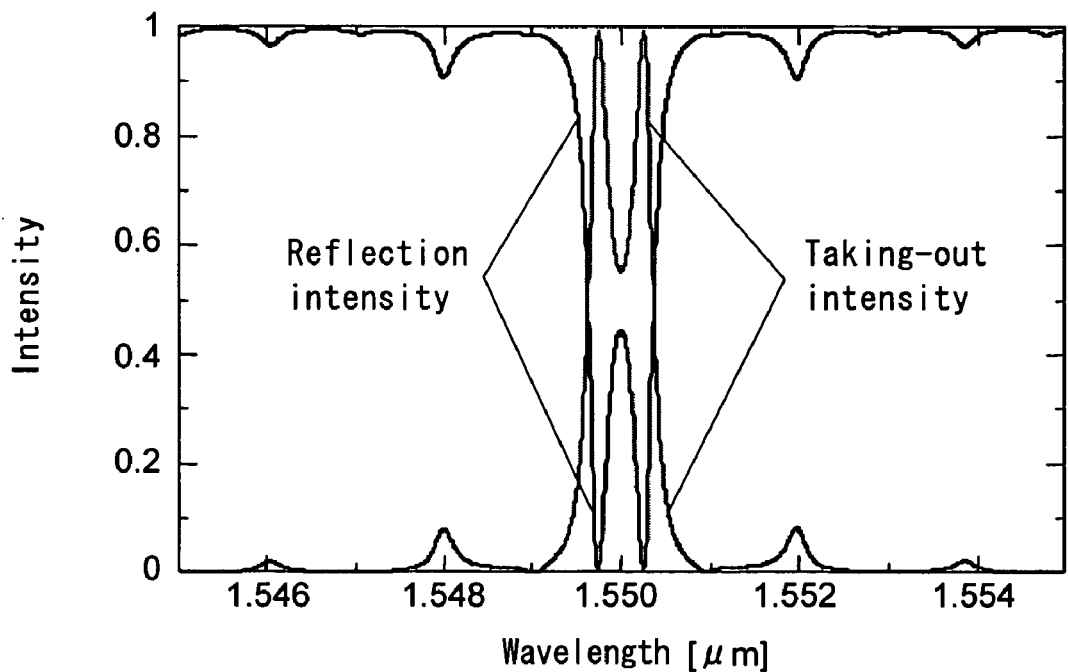

Fig. 11
(a) $2L/\lambda_0 =389.0$, $2L'/\lambda_0 =389.5$
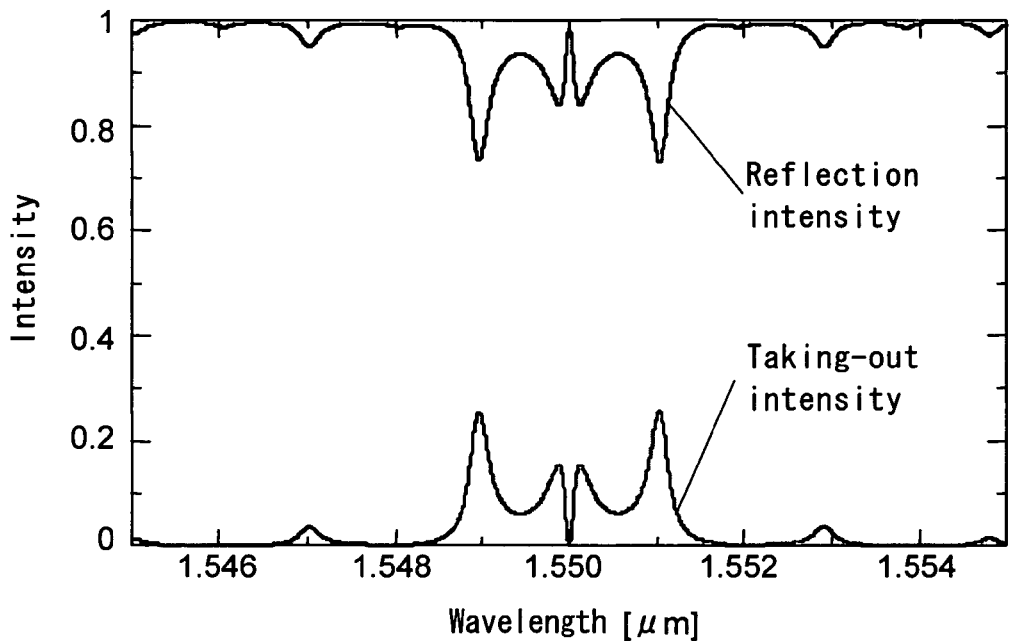
(b) $2L/\lambda_0 =389.0$, $2L'/\lambda_0 =389.0$
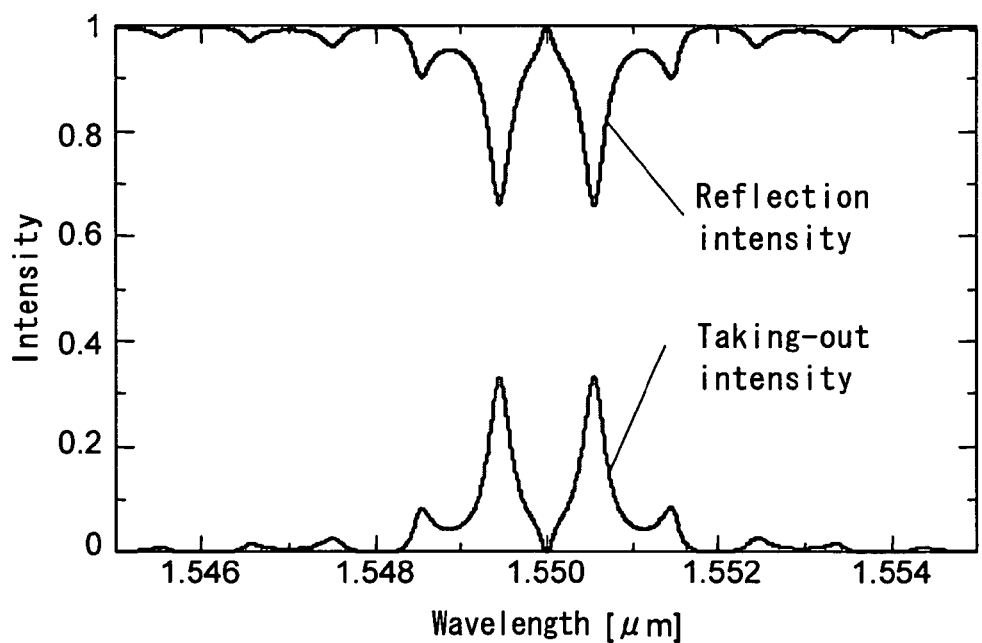

Fig. 12
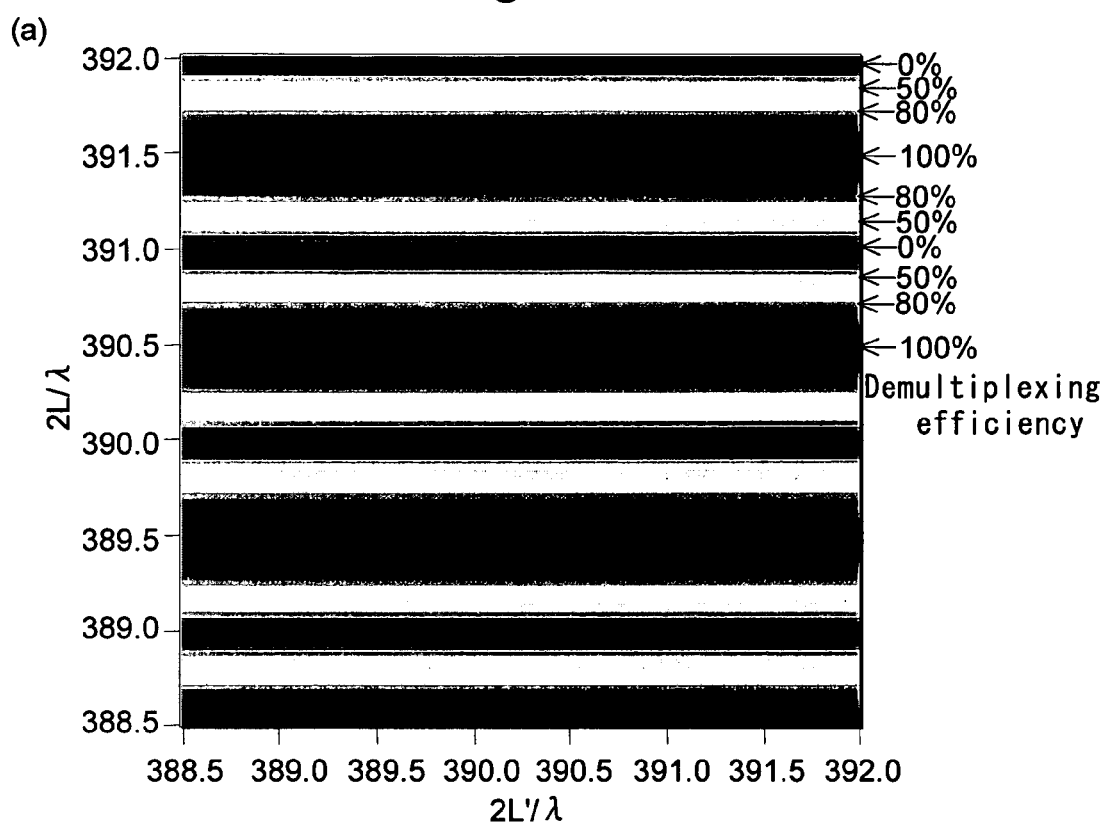
(a)
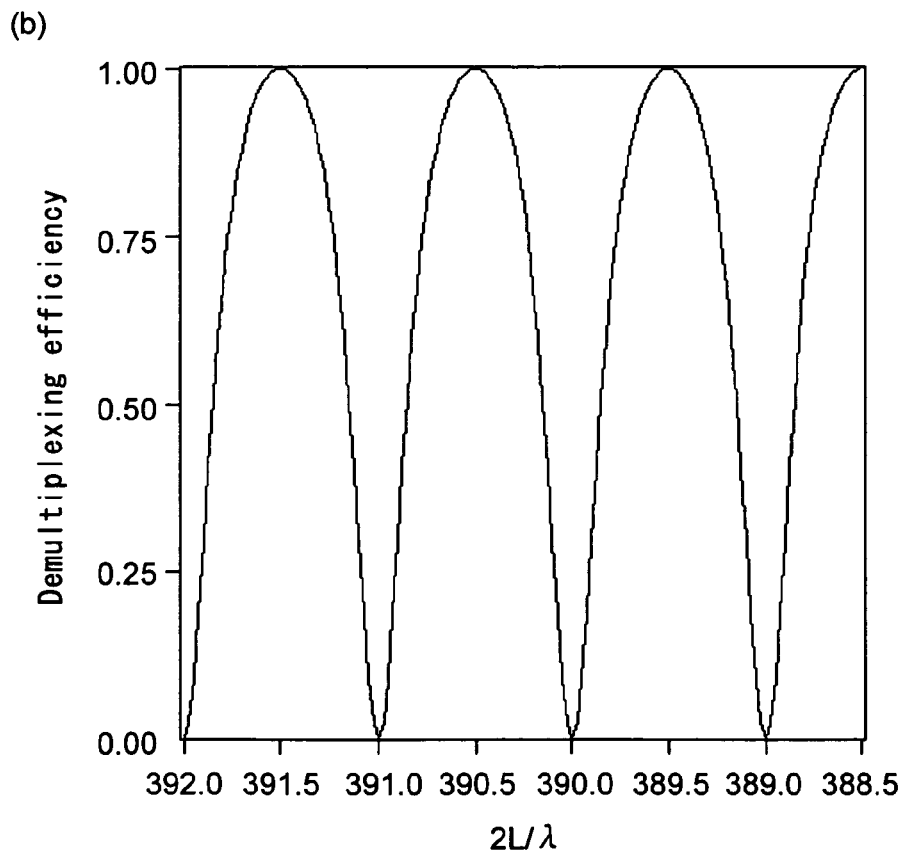
(b)

TWO-DIMENSIONAL PHOTONIC CRYSTAL OPTICAL MULTIPLEXER/DEMULTIPLEXER USING BOUNDARY REFLECTION

TECHNICAL FIELD

The present invention relates to a two-dimensional photonic crystal optical multiplexing/demultiplexing device used for wavelength division optical multiplex communication or the like. Particularly, the present invention relates to a technique for improving the multiplexing/demultiplexing efficiency.

BACKGROUND ART

Recently, a photonic crystal has been drawing attention as a new optical device. The photonic crystal is a functional material having a periodical distribution of refractive index, which provides a band structure with respect to the optical and electromagnetic energies. Especially, the photonic crystal is characterized by the fact that it forms an energy region (a photonic band gap) therein through which neither light nor electromagnetic wave are impossible to propagate.

By introducing an appropriate defect in the distribution of refractive index in the photonic crystal, an energy level belong to the defect (defect level) is created in the photonic band gap. In this state, only light with the wavelength corresponding to the energy of the defect level can be present in the wavelength band corresponding to the energies in the photonic band gap. Defects arranged in a line in a photonic crystal constitute a waveguide, while a point-like defect in a photonic crystal works as a resonator.

A photonic crystal can be a two-dimensional crystal or a three-dimensional crystal. Though either of the crystals has respective advantages, the two-dimensional crystal is advantageous in that the crystal is comparatively easy to manufacture. In Japanese Unexamined Patent Application No. 2001-272555, it is described that, in a two-dimensional photonic crystal, a periodical distribution of refractive index is created by arranging cylindrical holes periodically in a triangular lattice pattern, that a waveguide is formed by rendering the cylindrical holes defective in a linear arrangement ([0025] and FIG. 1), and that a point defect is formed in the vicinity of the waveguide ([0029] and FIG. 1). Further, in Japanese Unexamined Patent Application No. 2001-272555, a point defect created by increasing the diameter of a cylindrical hole among those periodically arranged has been described as an example.

The applicants of the present application have proposed, in Japanese Unexamined Patent Application No. 2003-279764, to create a cluster defect by rendering defects in two or more adjoining modified refractive index areas among those constituting the periodical distribution of refractive index. A defect of the modified refractive index area is created by rendering the refractive index of a modified refractive index area different from that of other modified refractive index areas. In this construction, a defect of a modified refractive index area whose refractive index is lower than that of other modified refractive index areas is called an acceptor type defect, and a defect of a modified refractive index area whose refractive index is higher than that of other modified refractive index areas is called a donor type defect. A defect created by enlarging a cylindrical hole, which is described in Japanese Unexamined Patent Application No. 2001-272555, is an acceptor type defect, and a defect created by providing no modified refractive index area is a donor type defect. A cluster defect, and a point defect created by rendering only one modified refractive index area defective, are collectively referred to as "point-like defect".

In Japanese Unexamined Patent Application No. 2003-279764 mentioned above, the applicants of the present application have proposed a two-dimensional photonic crystal with an in-plane heterostructure that has plural forbidden band zones each having modified refractive index areas with a different cycle distance from one another, where, in each of the zones, a point-like defect is created. With such a construction, when point-like defects in the same shape are provided in the respective forbidden band zones, lights with different wavelengths can be resonated at respective point-like defects due to differences in the cycle distance of the modified refractive index areas.

A variety of applications can be thought of the two-dimensional photonic crystal having such point-like defects. As a typical example, an optical multiplex communication can be shown. For the optical multiplex communication of recent years, the wavelength-division multiplexing scheme is adopted, in which lights with plural wavelengths each carrying respective signal are propagated along a single transmission line. A two-dimensional photonic crystal, by providing plural point-like defects corresponding to respective wavelengths in the vicinity of a waveguide, can be used as a demultiplexer for taking out lights (signals) with specific wavelengths out of lights propagating in the waveguide from the point-like defects, or alternatively, as a multiplexer for introducing lights with specific wavelengths into the waveguide from the point-like defects.

In the case where a conventional two-dimensional photonic crystal described above is used as a demultiplexer, the demultiplexing efficiency will be 100% if, among lights passing through the waveguide, all of light with the wavelength to be demultiplexed flows into the point-like defect. However, actually, more than 50% of the light with wavelength to be demultiplexed passes over the waveguide without flowing into the point-like defect. Hence, an actual demultiplexing efficiency is 50% or less.

In the case where the two-dimensional photonic crystal is used as a multiplexer, when the light to be multiplexed flows into the waveguide from a point-like defect, the light is divided into two ways of the waveguide. Therefore, the take-out efficiency of multiplexed light from the waveguide is 50% at the highest.

The present invention has been made in order to solve such problems, and it is an object of the present invention to provide a two-dimensional photonic crystal optical multiplexer/demultiplexer with high multiplexing efficiency and demultiplexing efficiency.

DISCLOSURE OF THE INVENTION

To solve the aforementioned problems, in the first mode of the present invention, a two-dimensional photonic crystal optical multiplexer/demultiplexer using boundary reflection includes:

a) a slab-shaped body;

b) plural modified refractive index areas arranged periodically in the body, each having a refractive index different from that of the body;

c) a waveguide formed by creating defects of the modified refractive index areas in a linear arrangement;

d) a point-like defect formed by creating a defect of modified refractive index area in the vicinity of the waveguide; and e) a first reflecting section provided at an end of the waveguide, and reflecting at least part of light with the resonant wavelength of the point-like detect.

In the second mode of the present invention, a two-dimensional photonic crystal optical multiplexer/demultiplexer using boundary reflection includes:

a) a slab-shaped body;

b) two or more forbidden band zones provided in the body;

c) plural modified refractive index areas provided in each of the forbidden band zones, each area having a refractive index different from that of the body, and periodically arranged in the body in a different cycle distance from each other in each of the forbidden band zones;

d) a waveguide formed by creating defects of modified refractive index areas in a linear arrangement in the respective forbidden band zones, and passing through all the forbidden band zones;

e) a point-like defect created in the vicinity of the waveguide in each of the forbidden band zones; and f) a first reflecting section provided at an end of the waveguide, and reflecting at least part of light with the resonant wavelength of the point-like defect, wherein, g) a part of a waveguide-transmittable wavelength band in each of the forbidden band zone is not included in a waveguide-transmittable wavelength band of all forbidden band zones present on the side of the first reflecting section from the forbidden band zone, but included in the waveguide-transmittable wavelength band of all forbidden band zones present on the side opposite to the first reflecting section from the forbidden band zone; and h) the resonant wavelength of the point-like defect created in each of the forbidden band zones is included in the part of the transmission wavelength band.

The two-dimensional photonic crystal optical multiplexer/demultiplexer using boundary reflection disclosed in the present invention uses a two-dimensional photonic crystal as the matrix, where the matrix is composed of a slab as the body, where the thickness of the slab is sufficiently smaller than its size in the in-plane direction, and areas having refractive index different from that of the body are arranged periodically in the body. In the two-dimensional photonic crystal as the matrix, a photonic band gap is created in the presence of the modified refractive index areas periodically arranged, and light having corresponding energies is not allowed to be present. That is, light in wavelength bands corresponding to the photonic band gap cannot pass through the body. Materials of the body that can be used include, for example, Si and InGaAsP. A modified refractive index area is an area created by placing a member in the body made from a material having refractive index different from that of the material of the body. A typical example is a cylindrical hole as described in Japanese Unexamined Patent Application No. 2001-272555. If a cylindrical hole is adopted, what is required is to form a hole in the body, and the hole can be fabricated easier than placing a certain member in the body.

A defect formed in a part of the modified refractive index areas disturbs the periodicity of the crystal lattice. By appropriately setting parameters, such as the refractive index or the size of the defect, a defect level is created in the photonic band gap, and light with the wavelength corresponding to the energy of the defect level can be present at the position of the defect. By forming defects successively in a linear arrangement, a waveguide is created that can transmit light of a certain wavelength range in the photonic band gap. This waveguide guides multiplexed light including plural wavelength components before demultiplexing at an optical demultiplexer or after multiplexing at an optical multiplexer. The multiplexed light is introduced from an end of the waveguide in the case of an optical demultiplexer, and taken out from an end of the waveguide in the case of an optical multiplexer.

A point-like defect is provided in the vicinity of a waveguide. The point-like defect may be either a point defect or a cluster defect. The defect of a modified refractive index area, which may be a point defect or a cluster defect, may be either of the acceptor type or of the donor type mentioned before. By appropriately setting parameters, such as the kind, the size or the position, of a point-like defect, a desired defect level is created in a photonic band gap, and only light with the wavelength corresponding to the energy of the detect level resonates at the detect. In the case of an optical demultiplexer, among multiplexed light including plural wavelength components propagating through the waveguide, light with the resonant wavelength of the point-like defect is introduced from the waveguide into the point-like defect, and then is taken outside from the point-like defect. In the case of an optical multiplexer, light with the resonant wavelength of the point-like defect is introduced into the waveguide from the outside through the point-like defect.

The construction having discussed above that a waveguide and point-like defects are provided in a two-dimensional photonic crystal as the matrix is the same as those proposed in Japanese Unexamined Patent Application Nos. 2001-272555 and 2003-279764. The present invention further includes a construction that reflection of at least a part of light with a predetermined wavelength occurs at the end opposite to the end of the waveguide where the multiplexed light is introduced into or taken out from. The end of the waveguide is referred to as the first reflecting section.

A typical example of the first reflecting section includes a construction in which the waveguide extends as far as an end of the two-dimensional photonic crystal body. With the construction, if the end of the body is in contact with the ambient space, the crystal is discontinuous in the lattice structure at the body end, and a part of light is reflected at the end of the waveguide reaching the end of the body. That is, the end of the waveguide serves as the first reflecting section without providing a special light reflecting member.

Another example of the first reflecting section is a construction that a waveguide is, in the same way as described above, formed in a two-dimensional photonic crystal so as to reach as far as an end of the body of the photonic crystal, to which end is connected another two-dimensional photonic crystal that does not transmit light with the resonant wavelength of the point-like defect. With this construction, the end of the waveguide serves as the first reflecting section reflecting all of light with the resonant wavelength of the point-like defect.

In the case of an optical demultiplexer with the above construction, of light with the resonant wavelength corresponding to the point-like defect propagating the waveguide, light passing over the point-like defect without being introduced is reflected on the first reflecting section, and returns to the point-like defect. Therefore, the intensity of light without being introduced into the point-like defect and ending up with a loss decreases compared to a conventional case, whereby the optical demultiplexing efficiency is improved. On the other hand, in the case of an optical multiplexer, of light introduced into the waveguide from the point-like defect, light propagating toward the end opposite to the end of the waveguide where light is taken out is reflected on the first reflecting section, and returns to the end of the waveguide where light is taken out. Therefore, the intensity of light that is lost at the end opposite to the end of the waveguide where light is taken out decreases compared to a conventional case, whereby the optical multiplexing efficiency is improved.

By appropriately setting the distance between the point-like defect and the first reflecting section, the demultiplexing efficiency or the multiplexing efficiency can be further increased. In the case of an optical demultiplexer, a reflection loss also occurs by the reflection of light at the point-like defect with the resonant wavelength of the point-like defect. Hence, it is desirable to set the distance between the point-like defect and the first reflecting section so that light reflected on the first reflecting section and light reflected on the point-like defect are attenuated by interference, or the phase difference of the two lights takes the value of $\pi$. Therefore, the two lights are both difficult to be present, and the intensity of light demultiplexed from the point-like defect increases, which means that the demultiplexing efficiency is improved. Note that the phase of light reflected on the point-like defect is reversed, while the phase of light reflected on the first reflecting section changes in a different way according to the construction of the first reflecting section. For example, in the case where the first reflecting section is constituted of the boundary between the slab and the air, no change occurs in the phase of light reflected on the boundary. Hence, in order to increase the demultiplexing/multiplexing efficiency, it is desirable to set the distance between the point-like defect and the first reflecting section to the value n/2 times the resonant wavelength of the point-like defect (where n is a positive integer, which applies in the description hereinafter). On the other hand, in the case where the first reflecting section is made of a metal surface, the phase of light reflected thereon is reversed. In this case, it is desirable to set the distance to the value (2n−1)/4 times the resonant wavelength of the point-like defect.

In the case of an optical multiplexer, it is desirable to set the distance between the point-like defect and the first reflecting section so that, of all the light introduced into the waveguide from the point-like defect, light propagating directly toward the end of the waveguide where light is taken-out, and light reflected on the first reflecting section are intensified by interference, that is, the phase difference between the two lights is 0. As a result, the multiplexing efficiency is improved. Since the phase of light propagating directly toward the end of the waveguide does not change, and the phase of light reflected at the first reflecting section becomes as described above, it is desirable to set the distance to the value n/2 times the resonant wavelength of the point-like defect in the case where the first reflecting section is constituted of the boundary between the slab and the air, while in the case where the first reflecting section is constituted of a metal surface, it is desirable to set the distance to the value (2n−1)/4 times the resonant wavelength of the point-like defect.

In the case of an optical demultiplexer, the demultiplexing efficiency can be improved by providing a second reflecting section reflecting at least part of light with the resonant wavelength of the point-like defect at the end of the waveguide opposite to the first reflecting section. Such a second reflecting section can be constructed, for example, by extending the waveguide as far as an end of the two-dimensional photonic crystal body. Improvement of the demultiplexing efficiency in this case is due to the phenomenon that light reflected on the first reflecting section and the point-like defect is further reflected on the second reflecting section and then introduced into the point-like defect. Moreover, it is desirable to set the distance between the point-like defect and the second reflecting section to the value where light introduced into the waveguide and propagating toward the point-like defect, and light reflected on the point-like defect and the first reflecting section and further reflected on the second reflecting section are intensified by interference, that is, the phase difference between the two lights is 0. Thereby, the demultiplexing efficiency is further improved.

The demultiplexing efficiency of an optical demultiplexer also depends on the Q value, which is a coupling coefficient between a point-like defect and an external optics. Q-value is a value representing the sharpness as a resonator of the point-like defect, which is defined by $Q=\omega_t \times E_0/E_1$, where $\omega_t$ is the resonant frequency (angular frequency) of the resonator, $E_0$ is the energy accumulated in the resonator, and $E_1$ is the energy lost in a unit time due to coupling with the external optical modes. A higher Q-value is desirable in a resonator since frequency selectivity (or frequency resolution) increases. In contrast to that, in the case of an optical demultiplexer, since light should be demultiplexed efficiently into the free space from the waveguide, in addition to the requirement of high frequency selectivity, it is necessary to appropriately set the coupling coefficient Qp between the point-like defect and the waveguide and the coupling coefficient Qv between the point-like defect and the air. For example, in the case where no reflection occurs on an end of a waveguide, the demultiplexing efficiency takes the maximum value if Qp=Qv, and its value is 50% as described above.

In the case where light with the resonant wavelength of the point-like defect is totally reflected on the first reflecting section, the demultiplexing efficiency η is obtained by the following equation (1) based on the mode coupling equation.

$$\eta = \frac{2Q_p Q_v |1 - \exp(-2j\beta L)|^2}{|Q_p + Q_v(1 - \exp(-2j\beta L))|^2}, \tag{1}$$

where L is the distance between the point of the waveguide nearest to the point-like defect and the first reflecting section. β is the propagation constant of the waveguide as defined by $\beta=2\pi/\lambda'$ using the wavelength $\lambda'$ of light in the waveguide. When L is determined so that the phase difference between light reflected on the first reflecting section and light reflected on the point-like defect becomes π as described above, $\exp(-2j\beta L)=-1$ is established. In this case, the demultiplexing efficiency η is $$\eta = \frac{8Q_p Q_v}{|Q_p + 2Q_v|^2}. \tag{2}$$

In equation (2), if Qp/Qv is set in the range of 1.4 to 2.8, the demultiplexing efficiency is 97% or more, where the loss is actually negligible. In the case where Qp/Qv=2, the demultiplexing efficiency is 100%, wherein light with a predetermined wavelength in the waveguide can be demultiplexed without loss owing to the point-like defect.

In a conventional two-dimensional photonic crystal optical demultiplexer, the maximum value of demultiplexing efficiency was 50% obtained in the case where Qp/Qv=1 as described above. The present invention makes it possible to obtain 100% as the maximum value of demultiplexing efficiency in a two-dimensional photonic crystal optical demultiplexer. Even in the case where Qp/Qv=1, the demultiplexing efficiency in the optical demultiplexer of the present invention can be 88%, and this value is higher than that in conventional cases.

The above-described conditions for controlling the demultiplexing efficiency include only parameters relating to the point-like defect and the part of the waveguide from the point nearest to the point-like defect and the first reflecting section. On the other hand, no specific limitation is placed on parameters with respect to the other part of the waveguide opposite to the first reflecting section, such as the distance between the end of the waveguide opposite to the first reflecting section and the point nearest to the point-like defect, or the reflectance of light on the end of the waveguide.

In order to obtain a higher demultiplexing efficiency by controlling the ratio of Qp to Qv, the value of Qp can, for example, be controlled by adjusting the distance between the point-like defect and the waveguide. The value of Qp can also be controlled by adjusting the width of the waveguide. While the resonant wavelength slightly changes with the above adjustments, the magnitude of the change is so small that the change is practically negligible. Even in the case where the change in the resonant wavelength is not negligible, the resonant wavelength can be readjusted with the ratio of Qp to Qv being kept unchanged by adjusting the cycle distance in the modified refractive index areas.

Then, description the second mode of the present invention of a two-dimensional photonic crystal optical multiplexer/demultiplexer using boundary reflection is described. This two-dimensional photonic crystal optical multiplexer/demultiplexer has an in-plane heterostructure having been proposed in Japanese Unexamined Patent Application No. 2003-279764.

The body is divided into zones, where the number of zones is the same as the number of wavelengths to be multiplexed or demultiplexed. The zone is referred to as "forbidden band zone". In the present invention, the forbidden band zones are arranged in ascending or descending order of wavelength to be multiplexed or demultiplexed. Modified refractive index areas in different cycle distances are arranged in respective forbidden band zones.

Defects of modified refractive index areas are created successively in a linear arrangement so that the linear arrangement of the defects passes through all the forbidden band zones, thereby forming a waveguide. The first reflecting section is provided in the same way as described before at the end of the waveguide opposite to the end where light is introduced into (in the case of an optical demultiplexer) or is taken out (in the case of an optical multiplexer). Similarly to the case described above, the first reflecting section can be formed by extending the waveguide to an end of the two-dimensional photonic crystal body, in which case the first reflecting section can be formed without providing a specific light-reflecting member. A two-dimensional photonic crystal that transmits no light with the wavelength to be multiplexed or demultiplexed may be connected to the forbidden band zone to the end of the body belongs.

Since the cycle distance of the modified refractive index area is different among the forbidden band zones, the wavelength band of light capable of being transmitted through the waveguide (waveguide-transmittable wavelength band) is different according to each forbidden band zone. As the cycle distance of the modified refractive index areas becomes larger, the waveguide-transmittable wavelength band is shifted to the longer wavelength side. In the second mode, using the above phenomenon, in the case where the forbidden band zones are arranged in ascending order of wavelength to be multiplexed or demultiplexed toward the first reflecting section side, the cycle distance of modified refractive index areas is rendered longer in the corresponding order, while in the case where the forbidden band zones are arranged in descending order of wavelength to be multiplexed or demultiplexed, the cycle distance of modified refractive index areas is rendered shorter in the corresponding order. With this construction, it is possible to include a part of the waveguide-transmittable wavelength band in each of the forbidden band zones is included in all the waveguide-transmittable wavelength bands belonging to the side opposite to the first reflecting section, but is not included in the waveguide-transmittable wavelength band of the forbidden band zone adjacent on the first reflecting section side. In each of the forbidden band zones, the cycle distance of modified refractive index areas is determined so that the part of the waveguide-transmittable wavelength band includes the wavelength of light to be multiplexed or demultiplexed.

A point-like defect that resonates with light of the wavelength to be multiplexed or demultiplexed is formed in each of the forbidden band zones. The point-like defect may be either the point defect or the cluster defect described before, and the defect of modified refractive index areas constituting a point defect or a cluster defect may be either the acceptor type or the donor type.

With this construction, in each forbidden band zone, the resonant wavelength of a point-like defect belonging to each forbidden band zone is not included in the waveguide-transmittable wavelength band in the forbidden band zones adjacent thereto on the first reflecting side. Hence, in the case of an optical demultiplexer, light having the wavelength to be demultiplexed in the forbidden band zone but having passed over the point-like defect without being introduced there cannot propagate the waveguide of the adjacent forbidden band zone on the side of the first reflecting section, but is totally reflected on the boundary between the forbidden band zone and the adjacent forbidden band zone. Light thus reflected returns to the point-like defect belonging to the forbidden band zone. Hence, the optical demultiplexing efficiency at the point-like defect in each of the forbidden band zones increases compared to the case where no reflection occurs at the boundary between the forbidden band zones. In the case of an optical multiplexer, of all light with the resonant wavelength of the point-like defect introduced into the waveguide from the point-like defect in each of the forbidden band zone, light propagating toward the first reflecting section, which is present on the side opposite to the side where light is taken out, is totally reflected at the boundary with the adjacent forbidden band zone, and propagates toward the side where light is taken out. Hence, the multiplexing efficiency also increases.

In each of the forbidden band zones, by appropriately setting the distance between the boundary of the forbidden band zone with the adjacent one on the first reflecting section side and the point-like defect in the forbidden band zone, the demultiplexing efficiency or the multiplexing efficiency can be further increased. In the case of an optical demultiplexer, it is preferable to set the distance so that the light reflected on the point-like defect belonging to the forbidden band zone and the light reflected on the boundary with the adjacent forbidden band zone are attenuated by interference, that is, the phase difference between the two reflected lights is π. In the case of an optical multiplexer, it is preferable to set the distance so that the light propagating from the point-like defect toward the light take-out port side of the waveguide and the light propagating in the opposite direction and reflected on the boundary with the adjacent forbidden band zone on the other side are intensified by interference, that is, the phase difference between the two lights is 0.

Note that there is no adjacent forbidden band zone on the first reflecting section side in the forbidden band zone to which the first reflecting section belongs. Light propagating toward the first reflecting section side is reflected on the first reflecting section. Hence, the distance between the point-like defect and the first reflecting section is set in the forbidden band zone to which the first reflecting section belongs. The condition for the setting is the same as the condition for the distance between the point-like defect and the boundary with the adjacent forbidden band zone in other forbidden band zones.

In the case of the second mode, as well as in the case of the first mode, the demultiplexing efficiency can be improved by adjusting Qp/Qv in an optical demultiplexer. In the second mode, light with the wavelength to be demultiplexed is totally reflected on the boundary of two adjacent forbidden band zones. Hence, equation (1) obtained based on the condition of total reflection on the first reflecting section in the first mode is established in each of the forbidden band zones in the second mode except for forbidden band zones provided with the first reflecting section. This is always established in the construction of the second mode, which is different from the case of the first mode. With the construction that light having a predetermined wavelength is totally reflected on the first reflecting section adopted, equation (1) is established in all the forbidden band zones including one provided with the first reflecting section.

The distance between the point of the waveguide nearest to the point-like defect and the boundary with an adjacent forbidden band zone is determined so that the phase difference between light reflected on the boundary with the adjacent forbidden band zone and light reflected on the point-like defect is π. If the value of Qp/Qv is set in the range of 1.4 to 2.8 in each of the forbidden band zones in the same way as that in the first mode, the demultiplexing efficiency can be 97% or more in any of the forbidden band zones. With Qp/Qv=2 in each of the forbidden band zones adopted, the demultiplexing efficiency in the forbidden band zone can be set to 100%.

Parameters associated with the other forbidden band zones do not contribute to the demultiplexing efficiency in each forbidden band zone. Hence, it is only required to design each of the forbidden band zones independently so that the demultiplexing efficiency is maximized in the forbidden band zone.

By changing the cycle distance and the size of the modified refractive index areas and the size of the point-like defect in the same ratio, the resonant wavelength of the point-like defect can be controlled without altering the Q-value or the like. Hence, if the optimal value of Qp/Qv is set by determining parameters of modified refractive index areas and the point-like defect in one forbidden band zone, the resonant wavelength in each forbidden band zone can be easily set while the optimal value of Qp/Qv is kept unchanged by magnifying or reducing the forbidden band zone in the same condition.

BRIEF DESCRIPTION OF THE DRAWINGS

FIGS. 1(a) and 1(b) are plan views showing an example construction of the first mode according to the present invention of a two-dimensional photonic crystal optical multiplexer/demultiplexer using boundary reflection.

FIGS. 10(a) and 10(b) are graphs showing the spectral intensity of light demultiplexed in the case where $2L/\lambda_0$ is a half integer.

FIGS. 11(a) and 11(b) are graphs showing the spectral intensity of light demultiplexed in the case where $2L/\lambda_0$ is an integer.

FIGS. 12(a) and 12(b) are a representation and a graph showing results of calculations of demultiplexing efficiencies in the case where Qp=2Qv in a two-dimensional photonic crystal optical demultiplexer using boundary reflection.

BEST MODE FOR CARRYING OUT THE INVENTION (1) Example of a Construction According to the Present Invention of a Two-dimensional Photonic Crystal Optical Multiplexer/demultiplexer Using Boundary Reflection FIG. 1 shows an example of a construction according to the present invention of the first mode of a two-dimensional photonic crystal optical multiplexer/demultiplexer using boundary reflection. Vacancies 12 each being a modified refractive index area are arranged in a body 11 periodically in a triangular lattice pattern. A waveguide 13 is created by rendering vacancies 12 defective in a linear arrangement. Both ends of the waveguide 13 reach ends of the body 11. In this example, no member is provided at an end for propagation light to be reflected thereon, and the end of the waveguide reaching the first end 15 of the body serves as the first reflecting section 17, which reflects a part of light propagating through the waveguide 13 due to the difference in refractive index between the body and the air. On the other hand, introduction of propagation light into the wave guide (in the case of an optical demultiplexer) or taking-out of the propagation light (in the case of an optical multiplexer) is conducted at the second end 16 at the other side of the body to the first end 15. Note that the second end 16 of the body reflects part of the propagation light in the waveguide in a similar way to that on the first end 15 of the body.

A point-like defect is provided at a position in the vicinity of the waveguide 13 and spaced by a predetermined distance L from the first end 15 of the body. FIG. 1(*a*) shows an example provided with an acceptor-type point defect 141 and FIG. 1(*b*) shows an example provided with a donor-type cluster defect 142. Distance L is the distance between the point-like defect and the first end 15 of the body and distance L' is the distance between the point-like defect and the second end 16 of the body.

FIG. 2 shows another example of the first mode. A two-dimensional photonic crystal 21 not transmitting light with the resonant wavelength of the point-like defect 14 therethrough is connected to the first end 15 of the body. With such a construction, light with the resonant wavelength of the point-like defect 14 is totally reflected on the first end 15 of the body.

By appropriately setting parameters such as the distances L and L' and reflectance on both ends of the waveguide, optical multiplexing efficiency and optical demultiplexing efficiency can be increased compared to conventional cases. In the case where the first reflecting section is in contact with the air as shown in FIG. 1, demultiplexing efficiency is increased by setting the distance L to the value n/2 times (wherein n is a positive integer) the resonant wavelength $\lambda_0$ of the point-like defect. This is because light reflected on the end of the waveguide at the first end 15 side of the body without altering the phase, and light reflected on the point-like defect while reversing the phase are attenuated by interference in the waveguide 13 between the point-like defect and the second end 16 side of the body. On the other hand, in multiplexing, the multiplexing efficiency is increased by setting the distance L to the value n/2 times the resonant wavelength of the point-like defect. This is because light propagating directly on the waveguide from the point-like defect to the second end 16 of the body and light propagating on the waveguide to the second end 16 after reflected on the first end 15 of the body are intensified by interference.

Note that $\lambda_0$ in the above description is the wavelength of light while propagating through the waveguide, which is made from a refractive index material, and is different from the wavelength $\lambda$ of light in the air when light is demultiplexed from the point-like defect.

Figure 3:
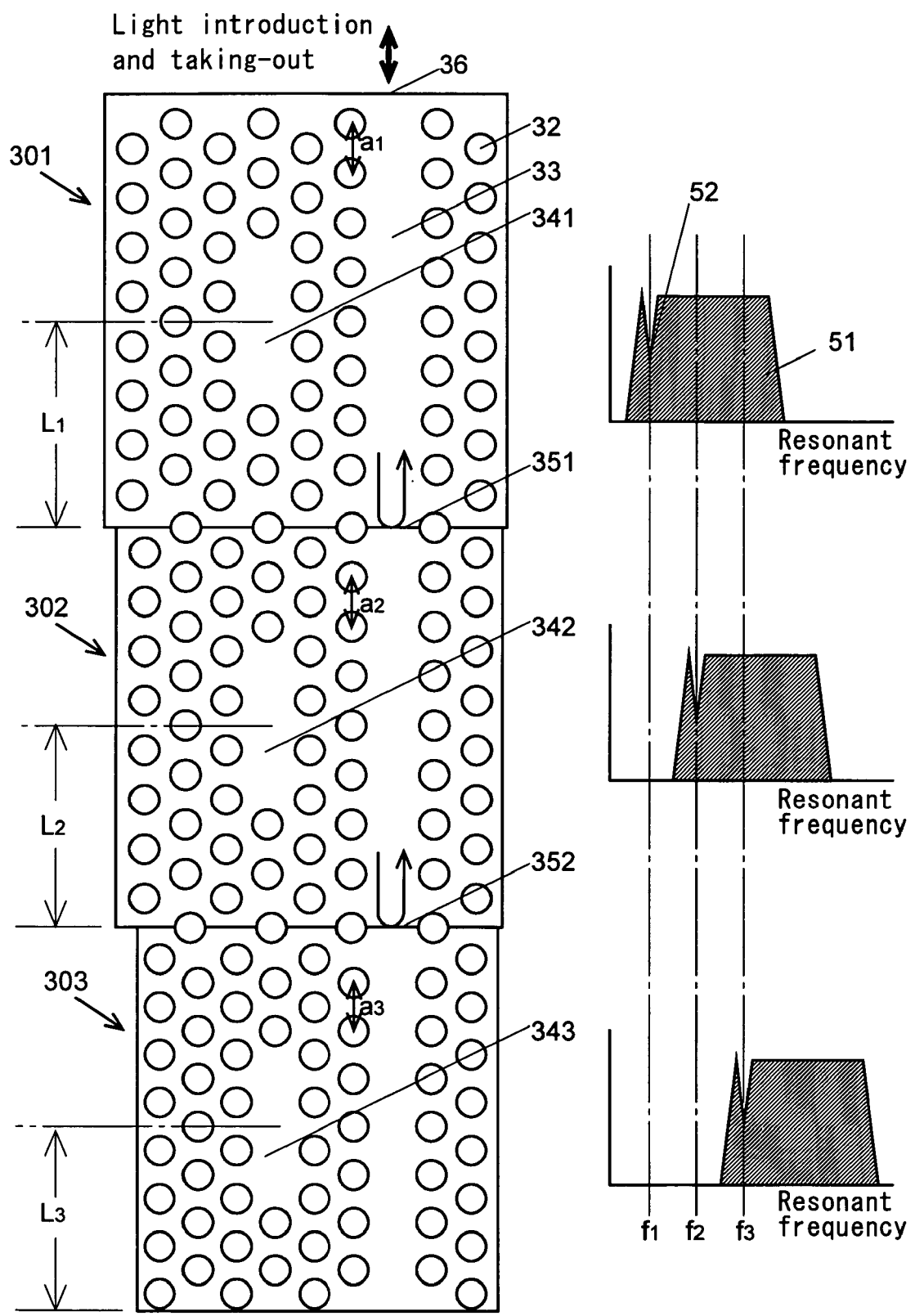
FIG. 3 is a plan view showing an example construction of the second mode relating to the present invention of a two-dimensional photonic crystal optical multiplexer/demultiplexer using boundary reflection and a schematic view showing the relationship between the transmission band of a waveguide and the forbidden band zone with respect to the resonant frequency.

FIG. 3 shows an example of a construction of the second mode of a two-dimensional photonic crystal optical multiplexer/demultiplexer using boundary reflection. An optical multiplexer shown in the left of FIG. 3 has a heterostructure consisted of plural forbidden band zones. In this example, the cycle distance $a_1, a_2, a_3, \ldots$ of the vacancies 32 in respective forbidden band zones 301, 302, 303, . . . are set so that $a_1 > a_2 > a_3 > \ldots$. A waveguide 33 is created by rendering vacancies 32 defective in a linear arrangement so as to pass through all the forbidden band zones. Donor-type cluster defects 341, 342, 343, . . . consisted of three linear vacancies are formed in the vicinity of the waveguide 33 in respective forbidden band zones 301, 302, 303, . . . .

Figure 4:
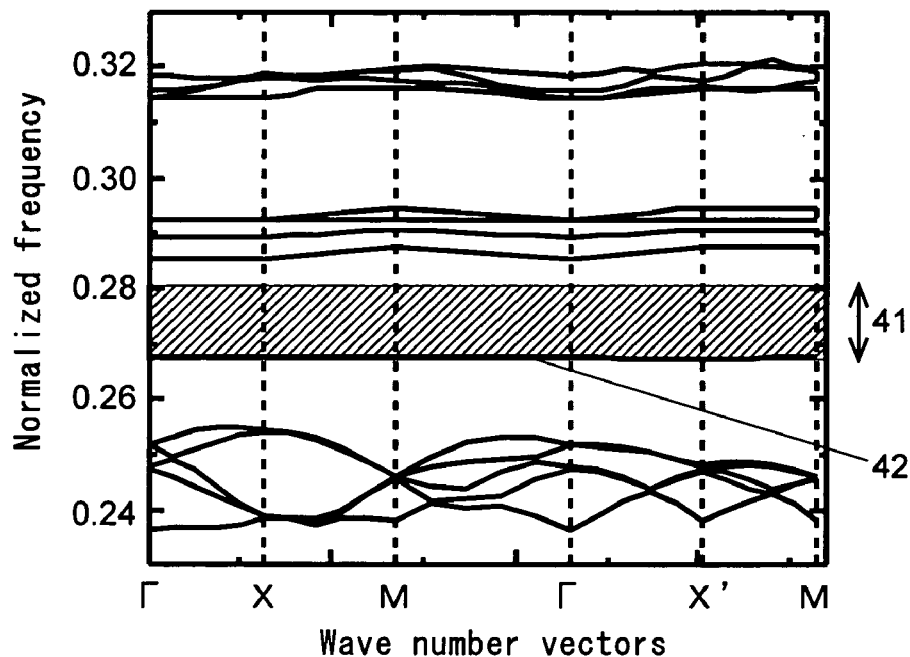
FIG. 4 is a graph showing defect levels due to a donor-type cluster defect obtained by embedding three modified refractive index areas in a linear arrangement.

FIG. 4 shows resonant frequencies of the donor-type cluster defects consisted of three linear vacancies calculated by the plane-wave expansion method. Note that details of the calculation are shown in Japanese Unexamined Patent Application No. 2003-279764. The ordinate in the figure is assigned to the normalized frequency obtained as a non-dimensional value by multiplying the frequency of light with a/c (wherein a is the cycle distance of the modified refractive index areas, and c is the velocity of light). A single defect level 42 exits in a transmission band 41 (in the range of 0.267 to 0.280 in normalized frequency) of the waveguide. The value of the defect level 42 is about 0.267 (in normalized frequency) and corresponds to a level in the vicinity of an end of the waveguide transmission band 41. Resonant frequencies in the donor-type cluster defects 341, 342, 343, . . . consisted of three linear vacancies can be obtained by multiplying normalized frequencies of the defective levels 42 with c and then by dividing the products with the cycle distances $a_1, a_2, a_3, \ldots$ of this example.

The right part of FIG. 3 schematically shows a relationship in each forbidden band zone between the transmission band and the resonant frequency of the waveguide. In this example, since defect levels are in the vicinity of an end of the waveguide transmission band, the defect level 52 in any forbidden band zone is included in the waveguide transmission band 51 of the adjacent forbidden band zone on the light introduction and take-out section 36 side of the waveguide, but not included in the waveguide transmission band 51 of an adjacent forbidden band zone on the other side of the waveguide from the light introduction/take-out section 36 side thereof. For example, the defect level $f_2$ of the forbidden band zone 302 is included in the waveguide transmission band of the forbidden band zone 301, which is located on the light introduction/take-out section 36 side, but not included in the waveguide transmission band of the forbidden band zone 303 on the other side of the waveguide from the light introduction and take-out section 36.

Figure 5:
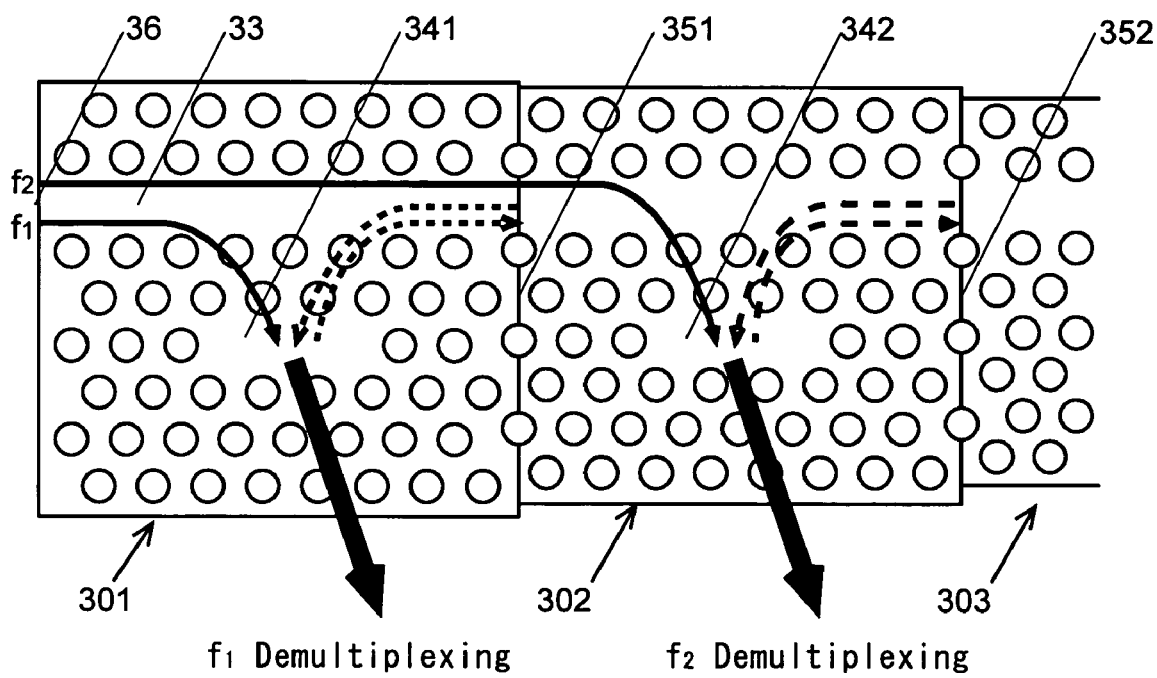
FIG. 5 shows transmission and reflection of light in the case where the two-dimensional photonic crystal in the example construction of FIG. 3 is used as an optical demultiplexer.

Therefore, light with the resonant frequency of a donor type cluster defect consisted of three linear vacancies in each of the forbidden band zones can pass through the waveguide as far as the forbidden band zone from the light introduction section 36 and can reach this donor-type cluster defect consisted of three linear vacancies. On the other hand, light passing through this donor-type cluster defect consisted of three linear vacancies and further propagating through the waveguide (which would be a loss in a conventional technique) cannot propagate through the adjacent forbidden band zone, is reflected on the boundary surface and again reaches this donor-type cluster consisted of three linear vacancies. For example, as is shown in FIG. 5, light with a frequency $f_2$ transmitted through the waveguide 33 in an optical demultiplexer is, as shown with a thick solid line, introduced into the donor-type cluster defect 342 consisted of three linear vacancies. A part of light with the frequency $f_2$ passes over the defect 342 and further propagates forward in the waveguide, but is not transmitted through the waveguide of the forbidden band zone 303; therefore, this part of light is reflected on the boundary surface 352 again to reach the defect 342 (see thick broken lines in FIG. 5). In this way, a loss caused by allowing light with resonant frequencies to be transmitted through the donor-type cluster defects 341, 342, 343, . . . consisted of three linear vacancies is suppressed, thereby enabling the demultiplexing efficiency of light in each defect to be improved.

Figure 6:
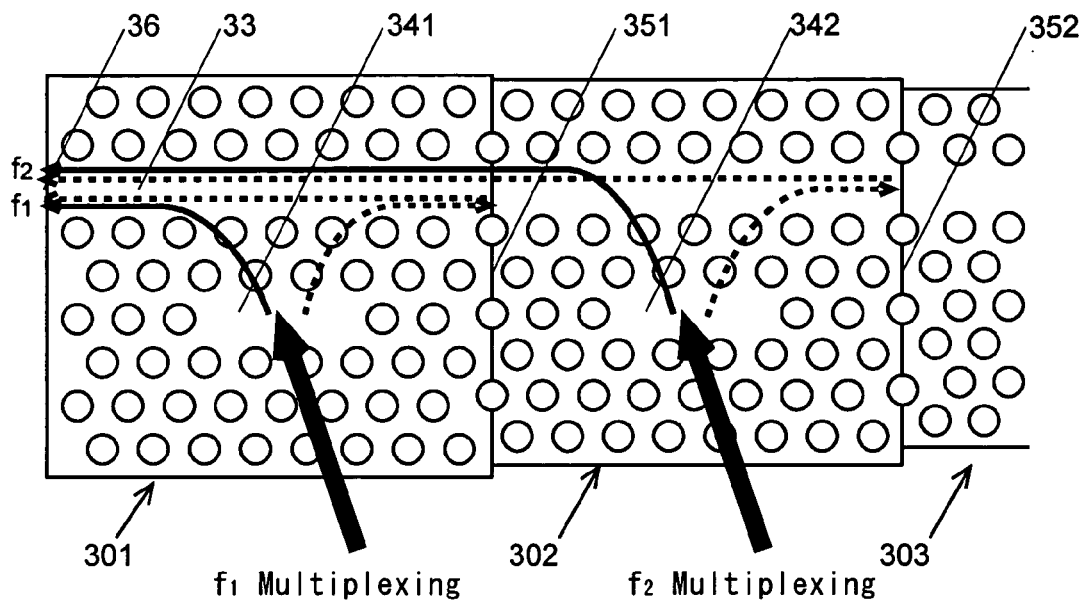
FIG. 6 shows transmission and reflection of light in the case where the two-dimensional photonic crystal in the example construction of FIG. 3 is used as an optical multiplexer.

In the case where the example of FIG. 3 is used as an optical multiplexer as well, efficiency can be increased. Light, which is a part of light multiplexed at a linear donor-type cluster defect and propagates to the other side of the waveguide from the light introduction/take-out section 36, is, as shown in FIG. 6, reflected on the boundary surface of a forbidden band zone (see thick broken lines in FIG. 6). Hence, all of light multiplexed from a defect reaches the light introduction/take-out section 36 of the waveguide.

Note that in the case of an optical demultiplexer, light reflected on the boundary surface of a forbidden band zone sometimes passes through as far as the light introduction/take-out section 36 without entering a linear donor type cluster defect, resulting in the demultiplexing efficiency of less than 100%. Therefore, it is necessary to appropriately set the distance between a defect and the boundary surface, or the like parameter as described later.

While a linear donor cluster defect can be constituted of two, four or more vacancy defects, it is desirable, as described above, to use a donor-type cluster defect consisted of three linear vacancies forming a single defect level in the vicinity of an end of a waveguide transmission band.

Figure 2:
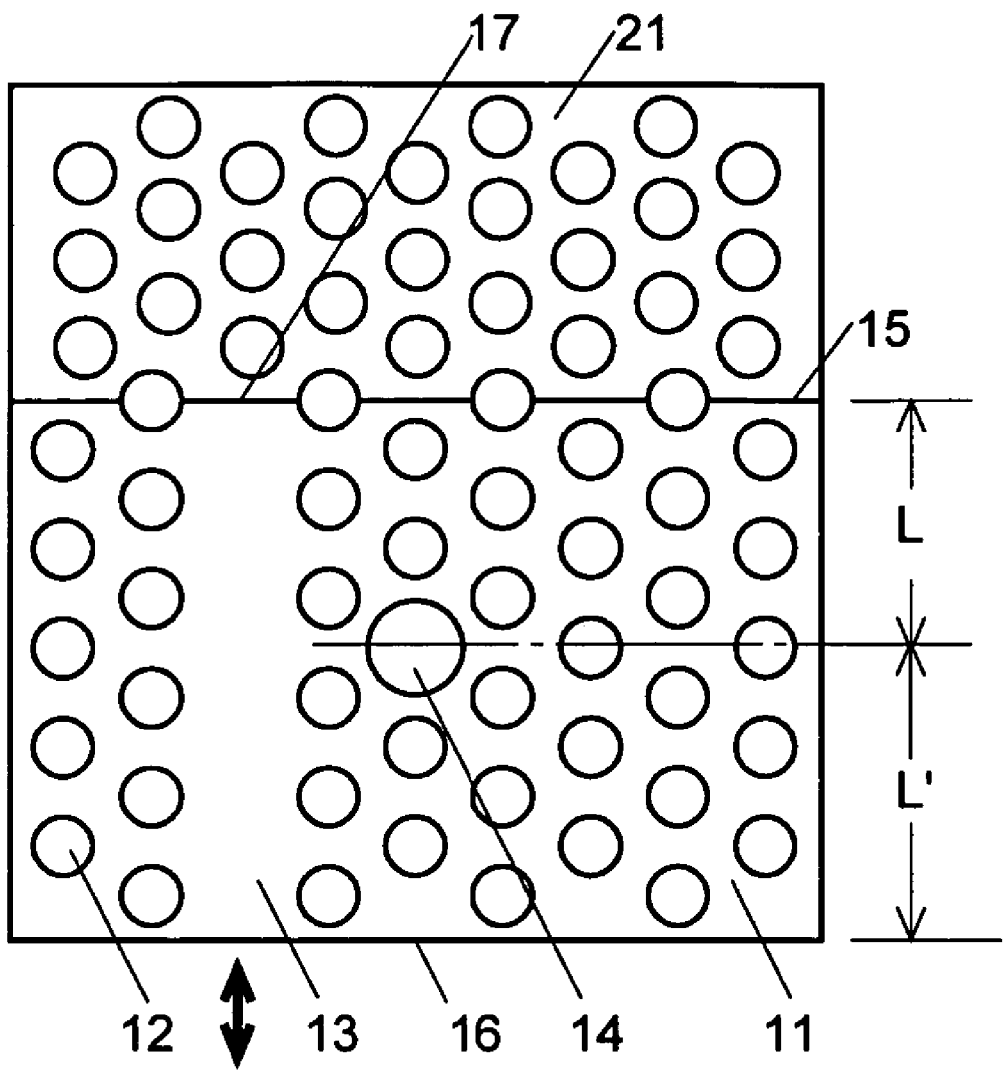
FIG. 2 is a plan view showing another example construction of the first mode of the two-dimensional photonic crystal optical multiplexer/demultiplexer using the boundary reflection.

(2) Calculation of Demultiplexing Efficiency in the Optical Demultiplexer Based on a Two-dimensional Photonic Crystal Using Boundary Reflection According to the Present Invention The demultiplexing efficiency of an optical demultiplexer according to the present invention is shown below as calculated on the basis of the mode coupling theory. While the following description will be given based on the construction of an optical demultiplexer of the first mode shown in FIGS. 1(a), 1(b) and 2, the following result is also obtained in a heterostructure optical demultiplexer of the second mode in the same way as that in the optical demultiplexer of the first mode for each of the forbidden band zones.

Figure 7:
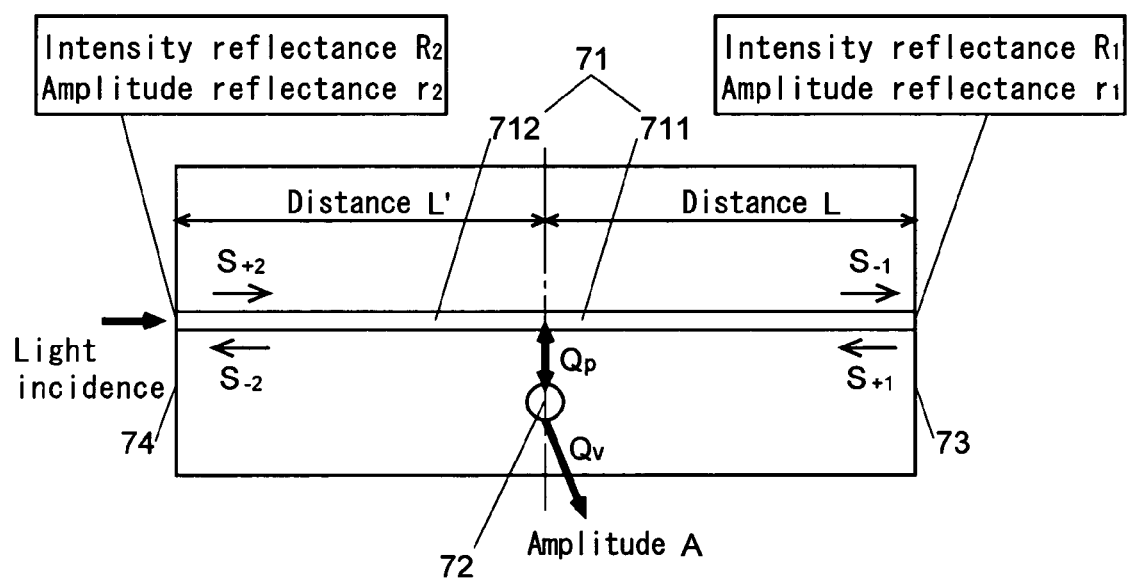
FIG. 7 shows five parameters for calculating the demultiplexing efficiency of a two-dimensional photonic-crystal demultiplexer using boundary reflection according to the present invention.
Figure 8:
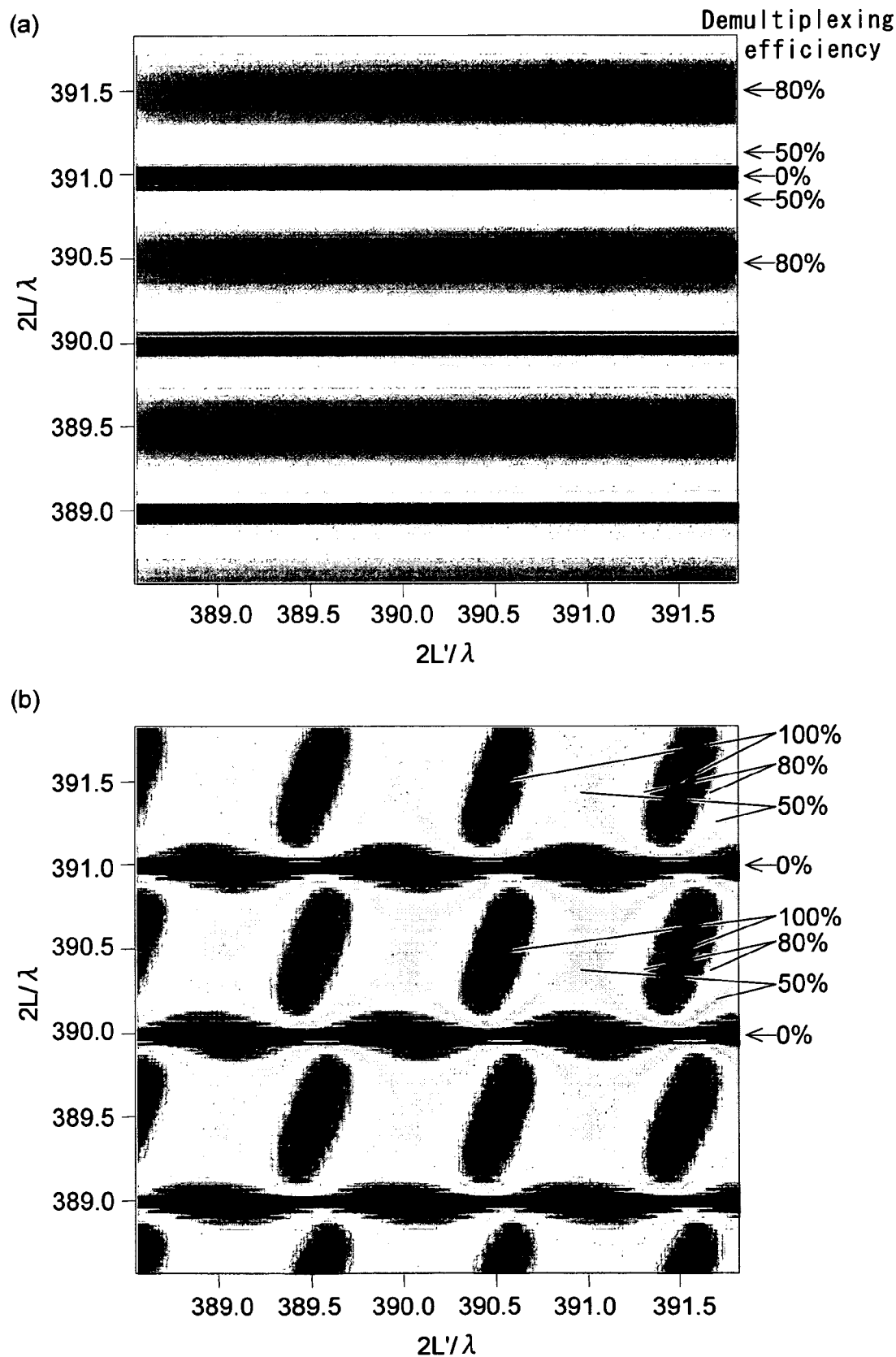
FIGS. 8(a) and 8(b) show results of calculations of demultiplexing efficiencies in the case where Qp=Qv in an optical demultiplexer based on a two-dimensional photonic crystal using boundary reflection.

Five amplitudes of light A, $S_{+1}$, $S_{-1}$, $S_{+2}$ and $S_{-2}$ are used as parameters. As shown in FIG. 7, A is an amplitude of light with the resonant wavelength $\lambda_0$ demultiplexed from the point-like defect 72, $S_{+1}$ is an amplitude of light with the wavelength $\lambda_0$ propagating toward the point-like defect 72 in the waveguide 711 between the first end section 73 of the body and the point-like defect 72, $S_{-1}$ is an amplitude of light with the wavelength $\lambda_0$ propagating toward the first end 73 side of the body in the waveguide 711, $S_{+2}$ is an amplitude of light with the wavelength $\lambda_0$ propagating toward the point-like defect 72 side in the waveguide 712 between the second end 74 of the body and the point-like defect 72, and $S_{-2}$ is an amplitude of light with the wavelength $\lambda_0$ propagating toward the second end 74 of the body in the waveguide 712. Intensity reflectance on the first end 73 of the body and on the second end 74 of the body is indicated by $R_1$ and $R_2$, respectively, and amplitude reflectance is indicated by $r_1$ and $r_2$, respectively. Moreover, Q-value between the waveguide 71 and the point-like defect 72 is indicated by Qp, and Q-value between the point-like defect 72 and the free space is indicated by Qv.

With the mode coupling theory applied, relationships among the five parameters A, $S_{+1}$, $S_{-1}$, $S_{+2}$ and $S_{-2}$ are expressed by three equations. Two equations are derived with respect to reflection on the first end 73 of the body and the second end 74 of the body. By solving the simultaneous equations to calculate the five parameters, the demultiplexing efficiency is obtained from the value of A.

FIGS. 8(a) and 8(b) to FIGS. 11(a) and 11(b) show results of calculation in the case where Qp=Qv. The condition of Qp=Qv gives the maximum demultiplexing efficiency of 50% in a conventional two-dimensional photonic crystal optical demultiplexer in which no consideration is given to boundary reflection.

Figure 9:
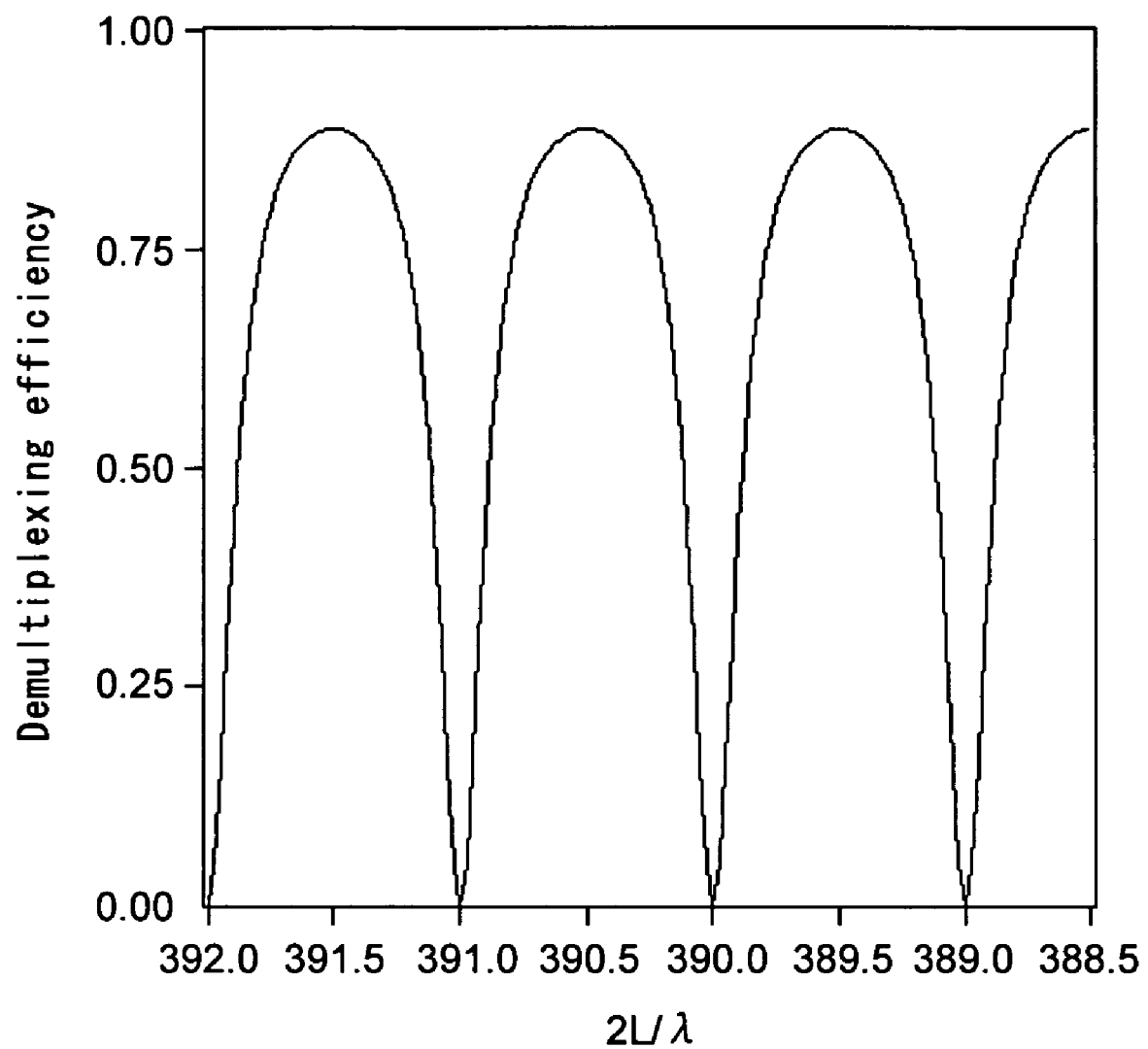
FIG. 9 is a graph showing the demultiplexing efficiency over $2L/\lambda$ of FIG. 8(a) as abscissa.

FIG. 8(a) shows the demultiplexing efficiency of a demultiplexer in the case where the intensity reflectance $R_1$ is 1 and the intensity reflectance $R_2$ is 0. In the first end 73 of the body, light is reflected by a metal mirror while its phase is reversed. Hence, the amplitude reflectance $r_1$ is −1. Note that the ordinate is assigned to $2L/\lambda$ as obtained by multiplying the distance L with 2 and then dividing the product with the wavelength $\lambda$, while the abscissa is assigned to $2L'/\lambda$ as obtained by multiplying the distance L' with 2 and then dividing the product with the wavelength $\lambda$. In FIG. 8(a), the demultiplexing efficiency does not depend on the distance L' and exhibits a constant value. In the description below, attention is paid to the distance L. FIG. 9 is a graph showing the demultiplexing efficiency with the abscissa assigned to $2L/\lambda$ ($2L'/\lambda$ is an arbitrary value in the range of calculation of FIG. 8(a)). The demultiplexing efficiency when $2L/\lambda$ is a half integer is about 88%. This value is higher than the maximum demultiplexing efficiency of 50% in a conventional two-dimensional photonic crystal optical demultiplexer. The reason why is considered that light reflected on the end 74 of the body in the waveguide 711 and light reflected on the point-like defect 72 attenuate each other by interference to thereby increase then amplitude of light demultiplexed from the point-like defect 72. For the reason contrary to that, the demultiplexing efficiency is 0% when $2L/\lambda$ is an integer.

FIG. 8(b) shows the demultiplexing efficiency of the demultiplexer in the case where the intensity reflectance $R_1$ is 1 and the intensity reflectance $R_2$ is 0.18. It is assumed in the calculation that light is reflected on a metal mirror on the first end 73 of the body and on the air on the second end 74 of the body. The value of the $R_2$ is obtained from experiments on reflection of light on the boundary between the body and the air. An amplitude reflectance $r_1$ is −1 in the same way as that in the case of FIG. 8(a). On the other hand, since the phase of light does not change by reflection on the second end 73 of the body, an amplify reflectance $r_2$ is adopted as $+(0.18)^{0.5}$. The demultiplexing efficiency in FIG. 8(b) also depends on the distance L' as well. The demultiplexing efficiency in FIG. 8(b) is further increased compared to the case of FIG. 8(a) and reaches 100% at that condition when the ordinate and abscissa are represented both by half integers.

FIGS. 10(a), 10(b), 11(a) and 11(b) show spectral intensities of demultiplexed light in a point-like defect with the resonant wavelength of 1.5 μm (the wavelength when being taken out into air) in the case where intensity reflectance $R_1$ and $R_2$, and amplitude reflectance $r_1$ and $r_2$ are the same as those in FIG. 8(b). In the case of FIG. 10(a) where $2L/\lambda_0$ and $2L'/\lambda_0$ are both half integer, the intensity of light taken out from a point-like defect is 100% at the median of resonant wavelength. In the case of FIG. 10(b) where $2L/\lambda_0$ is a half integer and $2L'/\lambda_0$ is an integer, the intensity of light taken out from the point-like defect is as low as about 60% at the median of resonant wavelength, while being 100% at the wavelength slightly shifted therefrom. In both cases of FIGS. 11(a) and 11(b) where $2L/\lambda_0$ is an integer, the intensity is 0% at the median of resonant wavelengths.

FIGS. 12(a) and 12(b) show results of calculation in the case where Qp=2Qv. The other parameters except Q-value are the same as in the case of FIG. 8(a) and FIG. 9 ($R_1$=0, $R_2$=0, $r_1$=−1). FIG. 12(a) shows a representation exhibiting the demultiplexing efficiency wherein the ordinate is assigned to $2L/\lambda$, while the abscissa is assigned to $2L'/\lambda$. FIG. 12(b) is a graph of the demultiplexing efficiency, wherein the abscissa is assigned to $2L/\lambda$ ($2L'/\lambda$ is an arbitrary value in the range of calculation in FIG. 12(a)). The demultiplexing efficiency does not depend on L' as in the case of Qp=Qv. On the other hand, the demultiplexing efficiency is 100% when 2L/λ is a half integer in this case different from the case of Qp=Qv. Hence, by setting Qp=2Qv, the demultiplexing efficiency can be obtained as 100% without providing a second reflecting section as in the case of FIG. 8(b), and further, without imposing a specific limitation on L'.

The invention claimed is:

1. A two-dimensional photonic crystal optical multiplexer/demultiplexer using boundary reflection, comprising:
    a) a slab-shaped body;
    b) plural modified refractive index areas arranged periodically in the body, each having a refractive index different from that of the body;
    c) a waveguide formed by creating defects of the modified refractive index areas in a linear arrangement, the end of which is located on an end of the body;
    d) a point-like defect formed by creating a defect of modified refractive index area or areas in the vicinity of the waveguide; and
    e) a first reflecting section provided at an end of the waveguide, for reflecting light having wavelength equal to the resonant wavelength of the point-like defect by connecting another two-dimensional photonic crystal not transmitting light with the wavelength to the end of the body.

2. The two-dimensional photonic crystal optical multiplexer/demultiplexer using boundary reflection according to claim 1, wherein the distance between the first reflecting section and the point-like defect is set so that the phase difference between light having wavelength equal to the resonant wavelength of the point-like defect and reflected on the point-like defect, and light with the same wavelength passing over the point-like defect and reflected on the first reflecting section is π.

3. The two-dimensional photonic crystal optical multiplexer/demultiplexer using boundary reflection according to claim 1, wherein the distance between the first reflecting section and the point-like defect is set so that the phase difference between light having wavelength equal to the resonant wavelength of the point-like defect and introduced into the waveguide from this point-like defect, and light with the same wavelength and reflected on the first reflecting section is 0.

4. The two-dimensional photonic crystal optical multiplexer/demultiplexer using boundary reflection according claim 1, wherein a second reflecting section reflecting at least part of light having wavelength equal to the resonant wavelength is formed at the end of the waveguide opposite to the first reflecting section.

5. The two-dimensional photonic crystal optical multiplexer/demultiplexer using boundary reflection according to claim 4, wherein the distance between the second reflecting section and the point-like defect is set so that the phase difference between light with the resonant wavelength in the point-like defect and introduced from the second reflecting section side, and light having wavelength equal to the same wavelength, introduced from the second reflecting section, reflected on the point-like defect, and further reflected on the second reflecting section is 0.

6. The two-dimensional photonic crystal optical multiplexer/demultiplexer using boundary reflection according to claim 1, wherein light having wavelength equal to the resonant wavelength of the point-like defect is totally reflected on the first reflecting section, and the ratio Qp/Qv is set in the range of 1.4 to 2.8 where Qp is the coupling coefficient between the point-like defect and the waveguide, and Qv is the coupling coefficient between the point-like defect and the air.

7. The two-dimensional photonic crystal optical multiplexer/demultiplexer using boundary reflection according to claim 6, wherein the ratio of Qp/Qv is set to 2.

8. A two-dimensional photonic crystal optical multiplexer/demultiplexer using boundary reflection, comprising:
    a) a slab-shaped body;
    b) two or more forbidden band zones provided in the body;
    c) plural modified refractive index areas provided in each of the forbidden band zones, each area having a refractive index different from that of the body, and periodically arranged in the body in a different cycle distance from each other in each of the forbidden band zones; and
    d) a waveguide formed by creating defects of modified refractive index areas in a linear arrangement in the respective forbidden band zones, and passing through all the forbidden band zones;
    e) a point-like defect created in the vicinity of the waveguide in each of the forbidden band zones; and
    wherein,
    f) a part of a waveguide-transmittable wavelength band in each of the forbidden band zone is not included in a waveguide-transmittable wavelength band of all forbidden band zones present on one side of the forbidden band zone, but included in the waveguide-transmittable wavelength band of all forbidden band zones present on the other side of the forbidden band zone; and
    g) the resonant wavelength of the point-like defect created in each of the forbidden band zones is included in the part of the transmission wavelength band.

9. The two-dimensional photonic crystal optical multiplexer/demultiplexer using boundary reflection according to claim 8, wherein the point-like defect is a linear donor-type cluster defect formed by rendering three adjacent modified refractive index areas defective.

10. The two-dimensional photonic crystal optical multiplexer/demultiplexer using boundary reflection according to claim 8, wherein the end of the waveguide of said one side is located on an end of the body, and another two-dimensional photonic crystal not transmitting light having wavelength equal to the resonant wavelength of the point-like defect is connected to the end of the body.

11. The two-dimensional photonic crystal optical multiplexer/demultiplexer using boundary reflection according to claim 8, wherein, the distance between the boundary with the adjacent forbidden band zone on said one side and the point-like defect provided in that forbidden band zone is set so that the phase difference between light having wavelength equal to the resonant wavelength of the point-like defect of the forbidden band zone and reflected on the point-like defect, and light with the same wavelength passing over the point-like defect and reflected on the boundary between the forbidden band zones is π.

12. The two-dimensional photonic crystal optical multiplexer/demultiplexer using boundary reflection according to claim 8, wherein the distance between the boundary with the adjacent forbidden band zone on said one side and the point-like defect provided in that forbidden band zone is set so that the phase difference between light with the resonant wavelength of the point-like defect of the forbidden band zone, and introduced into the waveguide from this point-like defect, and light with the same wavelength and reflected on the boundary between the forbidden band zones is 0.

13. The two-dimensional photonic crystal optical multiplexer/demultiplexer using boundary reflection according to claim 8, wherein the ratio Qp/Qv is set in the range of 1.4 to 2.8, where Qp is a coupling coefficient between the point-like defect and the waveguide in each of the forbidden band zones and Qv is a coupling coefficient between the point-like defect and the air.

14. The two-dimensional photonic crystal optical multiplexer/demultiplexer using boundary reflection according to claim 13, wherein the ratio of Qp/Qv is set to 2.

* * * * *